United States Patent
John et al.

(10) Patent No.: US 11,301,362 B1
(45) Date of Patent: Apr. 12, 2022

(54) CONTROL SYSTEM FOR DISTRIBUTED LOAD GENERATION

(71) Applicant: Amazon Technologies, Inc., Seattle, WA (US)

(72) Inventors: Ethan F. John, Seattle, WA (US); Ryan Preston Gantt, Seattle, WA (US); Carlos Arguelles, Edmonds, WA (US)

(73) Assignee: Amazon Technologies, Inc., Seattle, WA (US)

(*) Notice: Subject to any disclaimer, the term of this patent is extended or adjusted under 35 U.S.C. 154(b) by 117 days.

(21) Appl. No.: 16/698,661

(22) Filed: Nov. 27, 2019

(51) Int. Cl.
   *G06F 11/00* (2006.01)
   *G06F 11/36* (2006.01)
   *G06F 11/34* (2006.01)
   *G06F 11/30* (2006.01)

(52) U.S. Cl.
   CPC ........ *G06F 11/3664* (2013.01); *G06F 11/302* (2013.01); *G06F 11/3495* (2013.01); *G06F 11/3688* (2013.01); *G06F 11/3692* (2013.01)

(58) Field of Classification Search
   CPC .............. G06F 11/302; G06F 11/3495; G06F 11/3664; G06F 11/3688; G06F 11/3692
   See application file for complete search history.

(56) References Cited

U.S. PATENT DOCUMENTS

| | | | | |
|---|---|---|---|---|
| 8,141,030 B2* | 3/2012 | Finlayson | ........ | G06Q 10/06315 717/102 |
| 8,509,095 B2* | 8/2013 | Ormazabal | ........... | H04L 63/029 370/242 |
| 9,329,915 B1* | 5/2016 | Chandrasekharapuram | ................ | G06F 11/00 |
| 9,396,039 B1* | 7/2016 | Arguelles | ............ | G06F 11/3688 |
| 9,558,465 B1* | 1/2017 | Arguelles | ............ | G06F 11/3006 |
| 9,727,449 B2* | 8/2017 | Hermeto | ............. | H04L 41/5038 |
| 10,120,782 B2* | 11/2018 | Cohen | ................. | G06F 11/3664 |
| 10,198,348 B2* | 2/2019 | Buege | ................. | G06F 11/3457 |
| 10,474,563 B1* | 11/2019 | Rai | ........................... | G06F 8/60 |
| 10,489,807 B1* | 11/2019 | Arguelles | ............ | G06F 11/3452 |
| 10,915,437 B1* | 2/2021 | Arguelles | ............ | G06F 11/3676 |
| 2015/0074285 A1* | 3/2015 | Gahm | ................... | H04L 65/601 709/231 |
| 2019/0205203 A1* | 7/2019 | Hwang | ............... | G06F 11/0727 |

\* cited by examiner

*Primary Examiner* — Elmira Mehrmanesh
(74) *Attorney, Agent, or Firm* — Robert C. Kowert; Kowert, Hood, Munyon, Rankin & Goetzel, P.C.

(57) ABSTRACT

A test system includes a controller that creates test jobs to simulate a load for testing a target system or service. The jobs specify test data from a data store. The controller adds the test jobs to a job queue at a rate. Workers access jobs from the job queue and request data from the data store as specified in each job and send the request data to the service. Approximations (e.g., metric values indicating performance of the worker host resources, or performance of the system under test or performance of resources that implement the system under test, other feedback, etc.) of actual system characteristics such as the actual number of workers are obtained. Based on the metric values, the controller modulates various characteristics of the load generation system, such as a rate at which jobs are added to the job queue or the number of workers processing jobs.

20 Claims, 8 Drawing Sheets

CONTROL SYSTEM FOR DISTRIBUTED LOAD GENERATION

BACKGROUND

Large scale computing systems such as those found in network-based production services have become widely available in recent years. Examples of these systems are on-line retail, on-line internet service providers, on-line businesses such as photo processing, corporate networks, cloud computing services and/or web-based hosting services. These businesses may have multiple computing devices (e.g., thousands of hosts) in geographically separate locations configured to process millions of client requests daily or even hourly, for example. Ensuring that these services can scale to handle abnormal loads (e.g., client requests) is a non-trivial problem. Instead of testing an actual production system, software testers usually create a scaled-down copy of a production system with a smaller number of hosts and test with a smaller, proportional load. Other approaches include component-level stress tests where a single component of the architecture is targeted with each test. Additionally, using real-world data on a large-scale stress test is also challenging. Existing test solutions are not scalable to handle storing, accessing, processing, and/or applying a load to test at the size of today's large production systems. It may be desirable to create test that vary loads based on various time periods. For example, a business may want to test how a network site will handle increased traffic during a time period for which the business is advertising a special promotion, or test how a retail website will handle a volume of traffic expected on peak shopping days (e.g., Black Friday or Cyber Monday).

Testing a large-scale network with the methods described above often misses problems that would only surface on a higher scale that is only available in the production system. Additionally, the methods described above for testing components individually, for example, may not encounter issues that are found only through the interaction between sub-components in a system. This may lead to outages in the production system that affect business revenue and degrade the customer experience.

In another example, some systems experience traffic volumes that fluctuate, for example some traffic days (or hours) are orders of magnitude larger than most days or hours. It can be difficult to regulate testing of a large-scale system that is processing both production and synthetic traffic at the scale anticipated during those high-traffic periods as the contribution of the production traffic to the total traffic volume of the system under test may vary by large amounts during testing.

Figure 1:
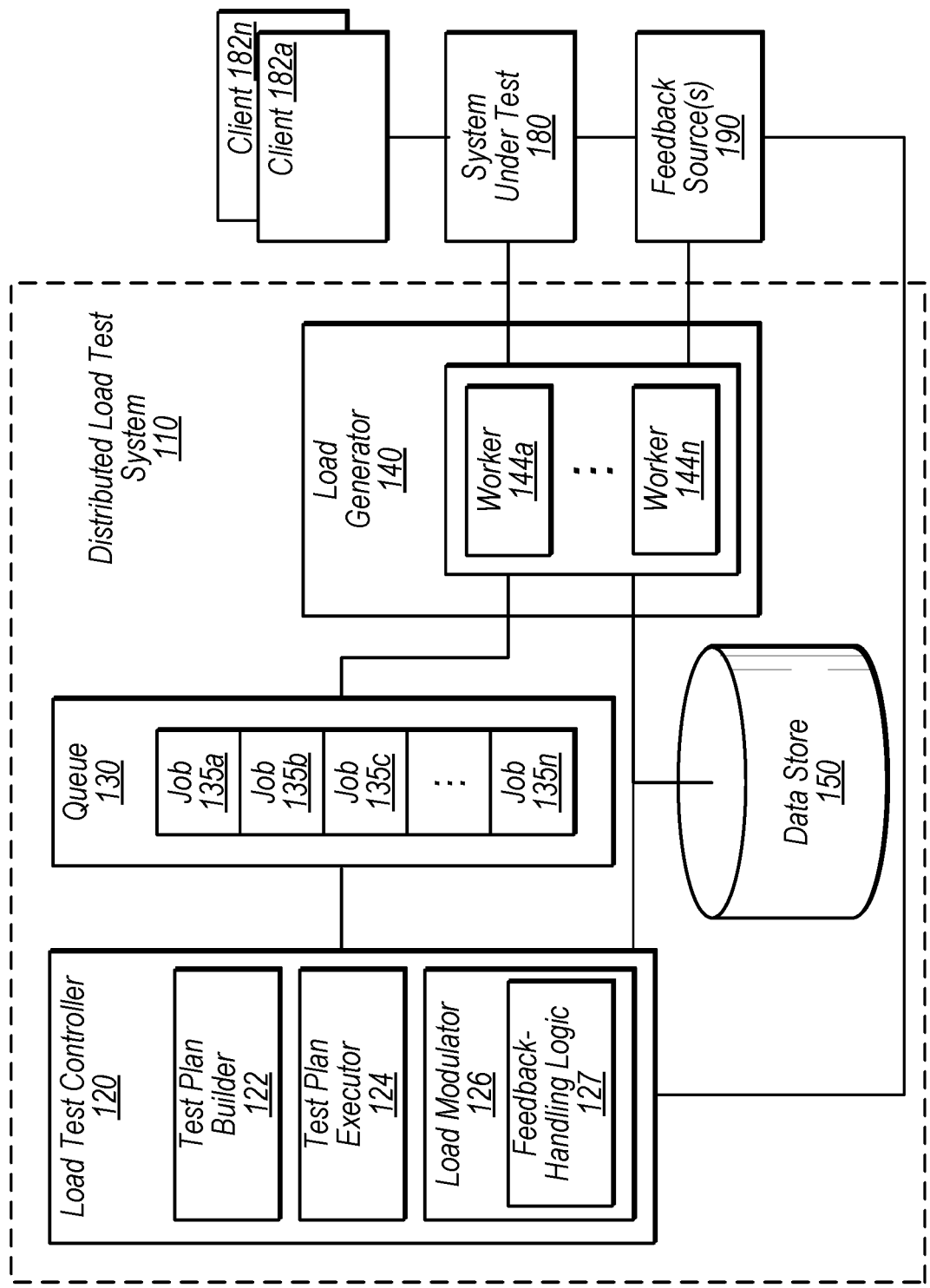
FIG. 1 illustrates a configuration of a system that supports modification of load generation for testing a network-based service, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, systems and methods for distributed load generation are provided. Examples of a control system for distributed traffic generation are provided, in particular. In some embodiments, the control system for distributed traffic generation leverages benefits of asynchronous communication and/or more than one communication channel to more effectively modulate large-scale test loads sent to large-scale target systems under test.

Generally, distributed load test systems (sometimes referred to as utilities) have trouble when used to test large scale systems. At least some of the shortcomings can stem from a required reliance on synchronous communication at such large scale, with a controlling host that adjusts load in direct response to accurate and timely system state. For example, for testing by smaller systems, synchronous communication may work with load generation threads that are co-resident on a single host and can communicate via shared memory, lock resources that must be incremented, and easily share state (i.e., small scale systems). But such a system starts to fail when many hosts or nodes are needed (large-scale testing) to generate large amounts of load. For example, no existing tool can effectively perform such communication, resources management, and easily share state at a large scale and/or across large fleets of nodes. Some system load generation systems start to have problems at large scale because tracking the shared state in a distributed manner is a complicated problem that incurs real distributed computing costs, such as use of a correct, linearizable system to communicate between hosts doing the work, and back to a controller.

Disclosed herein are embodiments where a controller (e.g., sometimes referred to as a load test controller, herein) is responsible for generating a workload for a fleet of workers to perform that puts a test load on a target system. In some instances, communication from the controller to the workers is via a communication channel (e.g., a control channel) that is distinct from a communication channel from the workers to the controller (e.g., a feedback channel). In some embodiments, the round-trip communication is asynchronous. Such characteristics may be described as loosely coordinated, in embodiments. An example is provided in FIGS. 1 and 4, described below, for instance.

For example, communication from a single-threaded load test controller to a fleet of workers may be via a control plane that provides job descriptions (sometimes referred to as jobs, herein) to workers that perform the tasks defined in the job descriptions. In some instances, the load test controller may not directly communicate with the workers. Instead, communication may be via various indirect mechanisms, such as via a queue implemented on a shared resource such as an object storage service, or via a streaming service, or via a storage location, or via a file object, for example.

For example, in some embodiments, the load test controller may emit or send or transmit a file-like object to a shared location or queue. The file-like object may include a message with instructions that instruct a worker to perform one or more tasks (e.g., "transmit X type messages for Y amount of time," "generate M amount of load for N amount of time," etc.). In at least one example, the load test controller does not directly know (e.g., does not track or does not receive data indicating) state associated with the workers, such as how many workers are available to process the jobs, what the workers capabilities are, and/or other state or status of the workers.

In embodiments, the load test controller may be configured to emit units of work on a schedule, without basis or knowledge of such state of the workers, in embodiments. Each worker picks up a unit of work (e.g., one or more jobs) as often as possible, executes the job(s)—thereby load testing the target system (or service) under test, then picks up more jobs as they are available, for example. In some embodiments, a monitoring service monitors the system under test (or the worker host resources, in embodiments) as the jobs are executed, gathers data about the system performance, and produces feedback values (e.g., such as metric values, test-related feedback, or other types of data) that may be provided to the load test controller of the distributed load test system as a sort of feedback (sometimes referred to as test-related feedback, herein). At least because in some embodiments it takes time for a change in the rate of jobs being delivered to the queue to work through the system and influence the characteristics of the system under test that is being monitored, the values used as feedback are asynchronous with respect to the control plane that controls the rate at which jobs are delivered to the queue. In embodiments, receipt of feedback values is asynchronous with receipt and queuing of test jobs from the load test controller, for example.

Receiving test-related feedback may include receiving feedback that was specified in a test plan. Such feedback may be test-related because it is the feedback specified in the test plan, for example. In some embodiments, it is not necessary for the feedback to be influenced by the inputs to either the target system under test or inputs to the load test system. In some embodiments, feedback includes feedback that is obtained from any other source other than the load generator 140 and/or obtained from a source other than workers 144.

The load test controller may determine how often to emit units of work, based on feedback data (and/or logic-based analysis of feedback values and the like), for example, or based on other criteria. In some instances, the determination may be made based on metrics from a metrics service, for example. In at least some embodiments, a metrics service provides aggregated, accurate, numerical data, at scale, and in a way to the load test controller that can be used by the load test controller to make determinations about actuating workers via a signal (direct or indirectly) sent to the workers. Example actuations include the number of jobs to put into the queue, a rate to place jobs in the queue, the amount of work or tasks to include in a job that will be placed in the queue, or the like. The specified feedback provided to the load test controller is considered broadly and may be associated with any characteristic of any system. The feedback values may come from any of one or more sources. For example, feedback data associated with either the load producing clients (e.g., a client-side failure rate of the workers) may be considered, as well as feedback data associated with the system under test (e.g., CPU utilization of the server hosts, etc.)—resources of the target of the load being generated. It is contemplated that feedback (or even other characteristics or other data) associated with other service or systems, such as other services or other systems that interact with the system under test or other systems that interact with the load generating workers may also serve as another possible source of feedback (e.g., metrics or other data) to be used as input to the load test controller to determine modification or modulation of the load being generated. Modification of the job rate may include increasing or decreasing the rate, but not taking the rate to zero (stopping the production of jobs) in some embodiments.

In some embodiments, the load test controller may modulate other features of the system, such as a quantity of workers provisioned or otherwise available to perform the jobs.

In some embodiments, the feedback data can be used to approximate or characterize what is happening amongst the workers or production system. For example, some metrics (e.g., such as transactions per second or the like) may approximate the number of workers actively processing jobs (e.g., an approximated distributed worker counter). Such manner of approximation or characterization can be beneficial over traditional systems that rely upon highly coordinated accuracy/correctness of a traditional distributed algorithm for traffic generation. For example, such systems that rely upon approximated feedback (sometimes referred to as "feedback" or "feedback values" herein) may scale better, weather system outages better, adjust based on error rates, etc.

Some example use cases demonstrate that in at least some embodiments, a load test controller applying such techniques can make what seem to be complicated decisions (complicated when considered in aggregate across large numbers of workers in a system operation at scale) with a relatively small number of inputs.

In an embodiment, it is desired to find a maximum possible throughput a target system can process, and it has been determined that a particular metric is expected to rise when incoming traffic rises (e.g., a transactions-successfully-processed metric or the like). To achieve the goal, a system configured according to various embodiments herein may receive specification of the particular metric (or metrics) via test plan or specification or via an interface (e.g., API, GUI, or the like). In some embodiments a criterion (or criteria) such as a threshold value or characteristic associated with the specified metric may also be received (e.g., via the test plan or interface, etc.). Logic within the controller (e.g., feedback-handling logic) may cause the load test controller to begin generating a test load (e.g., according to a default value, according to the test plan, or according to a configurable start load value, etc.) and then increase the load according to the feedback (e.g., a test plan-specified metric).

For example, in the use case of the transactions-successfully-processed metric, the controller increases the jobs emitted to the job queue until an associated criterion is met, until the transactions-successfully-processed metric stops rising, for example.

In another example use case, the controller could implement other feedback-handling logic such as a proportional-integral-derivative (PID), or an additive-increase/multiplicative-decrease (AIMD) algorithm (or other feedback mechanism) using a specified metric as input, and actuate the output of jobs to the queue based on the user-specified metric. The feedback data need not be emitted or generated by the workers. In some embodiments, the feedback data values are obtained as a side-effect of the load the workers are generating. For example, a service provider may provide a monitoring service that monitors resources of systems (e.g., target systems or systems under test, or other systems more tangential or indirectly related to the target system under test), and generates metrics based on the monitoring that can be used by the controller to make determinations.

System Architecture

In an example, a distributed load test system is implemented to apply a test load to a target system (or service) under test (e.g., a system under test may be an actual working production service, or a sandboxed service or application in some other environment without departing from the scope of this disclosure, etc.). For example, a network-based production service processes requests received from from clients for the production service via a network. For example, an e-commerce website receives traffic from customer browsing and purchasing products and services, or a cloud-based gaming service receives data from players, or a social media site receives updates from members. Production request data defining the requests may be captured and stored in a data store for subsequent use in testing the production service. In some embodiments, a distributed load test system includes a controller that creates test jobs according to a test plan for testing the production service. The test plan specifies production request data and a profile for using the production request data to simulate a load on the production service, for example. In some embodiments, a shared resource such as a job queue receives and queues jobs from the controller. The controller adds test jobs to the shared resource according to the test plan, in some embodiments. One or more workers access the jobs from the shared resource, and access production request data from the data store as specified in each job. The workers play the production request data to the production service to place a load on the production service (in addition to regular production load) in some embodiments.

In addition, in some embodiments, a distributed load test system modifies the load placed on the workers and the target system under test according to or based on indirect test-related feedback, such a metrics from a monitoring service, for example. A load test controller of the distributed load test system may modulate how many (e.g., quantity) or how quickly (a rate) jobs are made available to the workers (e.g., via a shared resource such as a queue or storage location). In some embodiments, the load test controller may modify the number of workers made available to process the jobs, based on the feedback.

In a particular example, a network-based production service may be an on-line retail business that may process millions of client request per day or even per hour, for example. However, on a given day such as peak shopping days (e.g., Black Friday, Cyber Monday) the number of client requests may be larger (e.g., two to four times larger or more) than an average day. In order to ensure the health of the production system during peak times, a distributed load test system may be implemented to test the production service hosting the on-line retail business. To create the test data, client requests (e.g., from clients of the production service) for a given time period may be captured for later playback on the production system during test, for example. Client requests may be captured without interfering with the normal processing of the client requests. Examples of client request data are one or more web page requests, selecting an object in the web page, one or more of the steps of the check-out process for the on-line retail business, or requests to a web services-based compute or storage service. A test plan may be created to simulate a stressful load such as peak shopping days or an increasing/decreasing load (e.g., client data captured for play during test). The production request data (e.g. captured client data) may be combined to create the test profile as determined by the test plan. The components utilized to test the production system may be scaled (e.g., by the controller 120, based on feedback) to meet the demand of the test plan, for example. Controllers may create test jobs as determined by the test plan and submit the jobs to job queues as would client requests in a production service. Workers access the jobs from the job queue, access the production request data from a data store as specified in the jobs, and play the production data on the production service, for example. The simulated requests from the test jobs execute on the production service in parallel with ongoing client requests, for example. Workers may be scaled independently to implement the test plan and/or in response to one or more feedback values, in embodiments.

FIG. 1 illustrates a configuration of a system that supports modification of load generation for testing a network-based service, according to one embodiment. In general, a system under test 180 (sometimes referred to as a target) such as a network-based production service, may be any type of network-based service, such as on-line retail, web service-based or cloud computing/storage, and/or image/web hosting service, for example. In some embodiments, the system under test 180 (e.g., network-based production service) receives requests from clients. Examples of requests received from clients are requests for one or more web pages viewable from a web-based browser, uploading one or more images to an online image processing business, and/or accessing a remotely implemented computing environment. Such a system under test 180 may receive thousands or even millions of client requests per day, minute, or seconds, for example. The client request data received by the service under test 180 (e.g., a network-based production service) during a given time period is stored in a data store 150 (e.g., a production request data store) for later use during testing of the system under test 180, in some embodiments.

Examples of client request data are web page accesses, selecting a link on a webpage or uploading and/or downloading images/data. Distributed load test system 110 may determine a test plan and create a test profile specifying a test based on data 150 such as production request data. The request data in request data store 150 is accessed by the distributed load test system 110 during testing of the service under test. Components, discussed in later figures, are implemented such that distributed load test system 110 plays the request data from data store 150 (e.g., captured client requests) to the system under test 180 to create "real-world", real-time, at scale, simulations to stress the system under test safely.

In some embodiments, system under test 180 is a network-based service implemented by one or more computers configured to process client requests. An example, of the system under test 180 may be a remote computing service configured to allow multiple clients to configure dedicated compute environments. Other examples are services of businesses such as on-line retail, web-hosting services, on-line image processing, brokerage firms, remote data storage, email services and/or social media websites. In some embodiments, system under test 180 receives a plurality of requests from clients (not illustrated). For example, requests from clients may be requests to access product pages on an on-line retail site. As another example, requests from clients may be to read from and/or submit information to a social media site. For a given on-line retail site, operating at expected production scale, the number of requests could be thousands or millions of requests per hour, for example.

In some embodiments, data store 150 stores client request data for a given time period. For example, the client request data is received and processed by a network-based production service. In addition, as a low-level background task for example, the client request data may be captured on an ongoing basis without interfering with the normal processing of the client requests. The captured client request data may be stored in data store 150 for subsequent use by distributed load test system 110. The production request data may be stored in time intervals such as minutes, for example. A time stamp and other identifying information are stored with the production request data, in some embodiments. In addition, the production request data may be encrypted prior to storage in data store 150, in some embodiments. The client request data may be organized in data store 150 according to time intervals (e.g., minutes) of standard time-frames (e.g., days). In some embodiments, captured production request data maybe maintained in data store 150 for a limited amount of time, such as a two-week rolling window, for example. In addition, data from time periods of interest may be kept indefinitely. A time period of interest may be a peak sales day for a retail business or a time period with a significant increase in traffic on a social media or news website.

In some embodiments, data store 150 includes, but is not limited to, solid state storage, one or more disk drives, multiple disk drives configured as a RAID system, network-based storage devices, databases, and/or a cloud computing resource.

In some embodiments, distributed load test system 110 is configured to test the target system under test with data from data store 150. For example, production request data may be captured client request data from actual client requests (e.g., from clients 182a-n) made to a production service (e.g., system under test 180) in some embodiments. Distributed load test system 110 plays (replays, in some instances) production request data from production request data store 150 to the system under test 180 to test the system under test 180. The production request data from a particular time period is replayed to the system under test 180 in addition to ongoing client requests from clients (not illustrated) of the system under test 180, in some embodiments. In other embodiments, the production request data from different time periods is combined to create a more stressful test. For example, to simulate a given time period of client requests, production request data from a particular time period or that exhibits a profile of interest may be replayed to the system under test 180. The production request data may be played to the system under test in order to test the system under test. As an alternate example, distributed load test system 110 may scale the tests to stress system under test 180 by merging production request data from similar standard time periods (e.g., from multiple days) captured at a particular time interval into a single test for the standard time period. Merging the production request data may create a stress test for system under test 180 to determine system under test 180's response to the simulated quantity of requests.

It is contemplated that other types of data than production client request data may be stored in data store 150 and played to the target system. For example, synthetic data or other data may be generated or stored and played to the target system.

Figure 2:
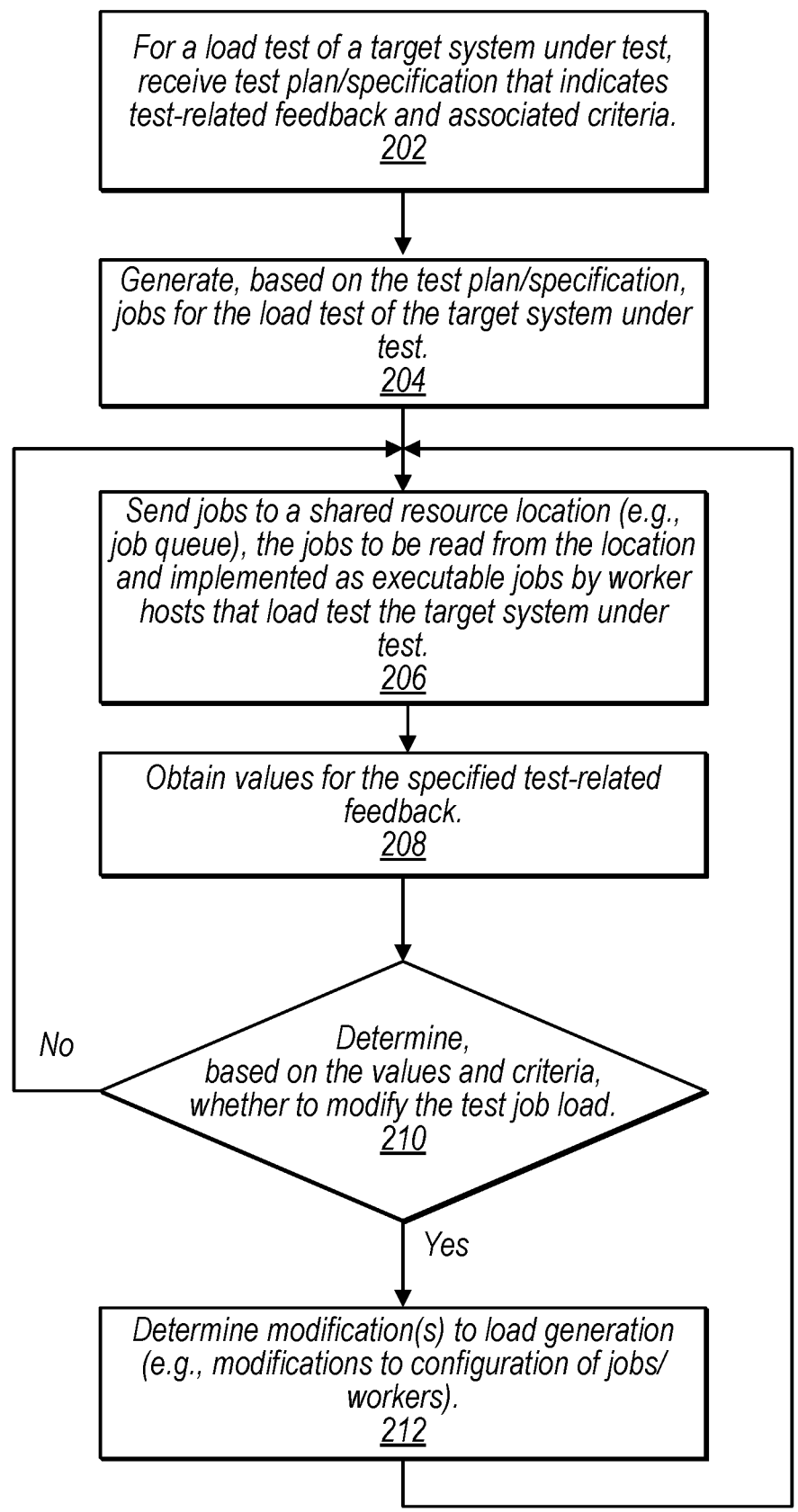
FIG. 2 is a flowchart of a method for implementing modification of load generation for testing a network-based service, according to embodiments.

FIG. 2 is a flowchart of a method for implementing modification of load generation for testing a network-based service, according to embodiments. The techniques disclosed in FIG. 2 may be performed by various components of the distributed load test system 110 illustrated in FIG. 1, components of the system illustrated in FIGS. 4A-C, components of the services and systems illustrated in FIG. 5, and components of the computer illustrated in FIG. 6, for example.

For a load test of a system under test, a test plan or test specification that indicates a test-related feedback and associated criteria is received (block 202). For example, a user or administrator may specify, in a test plan, or the system may generate a test plan that specifies a particular feedback such as a metric (e.g., transactions_successfully_processed) and a criterion (e.g., increase job output until the transactions_successfully_processed metric stops rising) via an interface of the distributed load test system. In an example, a disclosed process includes a load test system receiving specification of one or more metrics that measure performance of the system under test. The feedback includes values for the one or more specified metrics. Feedback is to be considered broadly and any of various metrics and criteria may be specified without departing from the scope of this disclosure.

The test plan may be created by a load test controller in the distributed load test system 110 (e.g., based on the production request data (e.g., captured client data) for example). Jobs for a load test of the target system under test can be generated based on the test plan/specification (block 204). For example, a controller 120 may generate instructions indicating how/when the production request data may be played by jobs submitted to a job queue. In embodiments, the target system under test is a production system, and the jobs specify use of production request data from a data store that stores requests previously made to the production system from customers of the production system. Jobs may be sent to a shared resource (e.g., job queue). The jobs may be read from the shared resource and implemented as executable jobs by worker hosts that load test the target system under test (block 206). For example, workers may perform the jobs submitted to the jobs queue by the controller. Values for the specified test-related feedback are obtained (block 208). The system may determine, based on the values and/or the criterion, whether to modify the test job load (block 210). In one example, if it is determined to not modify the test job load, the process may return to 206. In another example, if the transactions_successfully_processed metric continues to rise in response to the last rate change, the rate may be increased (e.g., iteratively) until the transactions transactions_successfully_processed metric stops rising, at which point the rate is no longer increased. In some embodiments, the test may be complete at this point.

At 212, modifications to load generation are determined. In embodiments, determining a modification is based on the feedback. For example, determining a modified rate for sending the jobs to the shared storage location may include a load test controller 120 modulating the rate based on feedback values or modifying the size of the jobs being generated by the controller. In embodiments, determining a modification includes determining to increase or decrease a target quantity of workers to perform the jobs. A type of worker performing the jobs may be modified, in some embodiments.

In another example, a new rate at which jobs are sent to the queue is determined in accordance with an additive-increase/multiplicative-decrease algorithm, for example. In embodiments, determining, based on the feedback, the modified rate for sending the jobs to the shared storage location includes applying a metric value to an additive-increase/multiplicative-decrease (AIMD) algorithm to determine the modified rate.

The test load may be modulated in other ways in response to feedback such as metrics, in some embodiments. For example, a load test controller may include logic (e.g., feedback-handling logic 127) that modifies configuration of the jobs or workers based on metric values received by the controller 120. For example, any of various techniques such as an additive-increase/multiplicative-decrease algorithm may be implemented, based on the feedback. Other algorithms are also contemplated, such as slow start. In some embodiments, feedback values are monitored (e.g., by the load test controller 120) to determine if more or fewer jobs should be generated and made available (e.g., via the queue 130). It is contemplated that in at least some embodiments, the load test controller 120 may instruct provisioning of more or fewer workers, based on feedback values. If, based on the feedback values, the logic in the load test controller determines not to modulate the rate (e.g., block 210, no) the process may return to block 206 (send more jobs to the queue at the rate). If it is determined to modulate the rate (210, yes) logic in the load test controller may determine a new rate (block 212) and the process returns to block 204 (send more jobs to the queue at the new rate) or ends because the test plan is complete (not illustrated). In at least some embodiments, logic 127 may be implemented by individual workers, in combination with logic 127 in a controller, or in place of logic 127, in some embodiments. For example, locating logic 127 in both the controller 120 and workers 144 could allow the controller to modify a quantity of workers processing jobs (e.g., based on a first metric) while allowing the individual workers to modify the jobs being performed (e.g., modifying size or rate of jobs).

Modifying the rate is intended to be interpreted broadly and may include increasing or decreasing an otherwise static rate, or changing characteristics of a dynamic rate that fluctuates such that the rate fluctuates dynamically in a different manner, for example, or altering a characteristic of the job rate in some other manner, such as changing the job descriptions for each job to include more, fewer, or different tasks, etc.

Example Sources of Test Data

Data played by the workers to the target system may come from various sources. In some embodiments, the data from client requests (e.g., from clients 182*a-n* in FIG. 1) at the production service (e.g., network-based production service 100 in FIG. 1) are captured. The client requests may be captured on an ongoing basis and stored in standard time intervals (e.g., minutes), in some embodiments. In addition to processing the request in network-based production service (system under test 180) the client requests are captured on an ongoing basis as a low level or background task in order to avoid interfering with client services. Capturing the client data for subsequent use according to a test plan, for example, allows for testing the network-based production service with real-world scenarios. As discussed above, a network-based production service may be a service such as on-line retail, web-hosting services, on-line image processing, brokerage firms, remote data storage, email services, cloud computing or storage, and/or social media websites. Thus, data from client requests may be information posted to a social media website, photos requested from an on-line image processing website or requests for product pages at an on-line retail website, for example. Client requests to the production service may be captured without interfering with normal processing of the client requests by the production service. The captured data is sufficient to subsequently reply the client request to simulate an additional production load on the production service.

In some embodiments, the production request data is stored in a data store (e.g., data store 150 in FIG. 1). In some embodiments, the production request data may be stored with metadata describing an aspect of the production service and timing information corresponding to the client request. For example, metadata may include information about the webpage accessed, the geographic location of the request or other unique identifiers that may be filtered during test. In some embodiments, the production request data is encrypted to maintain the security of the client data.

Data played to the target system may be of other types than production data, such as artificial or synthetic data, that is either generated as needed or stored to a data store 150 and played by workers, in embodiments.

Test Plans and Profiles

In some embodiments, a test plan is created to simulate loads on the production service using production request data. In some embodiments, the test plan specifies, along with test-related feedback and associated criteria, the request data and a test profile for using the request data to simulate a load on the target service. In some embodiments, the test plan specifies what request data will be combined to create a given test profile (e.g., constant load, increasing load, etc.). To determine the test profile, a controller (e.g., load test controller 120) may query the request data (e.g., in data store 150) and based on the query, determine a rate at which the request data should be applied to the target system under test. A controller 120 of the distributed load test system may determine and implement the test plan, in some embodiments. The quantity of controllers may scale in response to the test plan, in at least some embodiments, although some embodiments are restricted to a single load test controller 120.

Examples of test profiles specified by the test plan are a straight play of the production request data for a standard timeframe, a replay of filtered production request data, and/or a combination of several standard timeframes of production request data for a test during a given standard timeframe. A test plan that specifies a replay of filtered production request data, may filter the production request data according to a given location of the production service (e.g., only requests sent to a German version of a website hosted by the production service). A combination of the production request data may be created to simulate a more stressful load for example. The production request data may be re-ordered and/or combined with other production request data with similar standard time intervals from different time periods to simulate peak traffic, for example. Further details of the test plan will be provided in subsequent figures. In some embodiments, these features and characteristics specified in the test profile may be modified or modulated by the controller, in response to, or based upon feedback, such as the metrics described herein.

In some embodiments, jobs are created to implement the test plan. The test plan determines the production request data to play (e.g., simulated loads) to the target service. In some embodiments, the test jobs each include information corresponding to a file in data store 150 that includes the portion of request data to be played for that job and instructions for executing the test job. Instructions may identify transformations of some aspect of the request data.

In embodiments, the jobs (e.g., test jobs) may be replays of client requests that have been stored and are replayed to simulate loads (e.g., in the system under test 180 in FIG. 1). The jobs may be queued according to the test plan. The test plan determines the test profile for testing system under test 180. In some embodiments, a single load test controller 120 in the distributed load test system 110 creates jobs 135*a-n* to submit to the test queue 130 (it is contemplated that in at least some embodiments, more than one load test controller may control jobs placed in one or more queues). For example, the number of controllers may be scaled (e.g., by distributed load test system 110) in response to the feedback and quantity of jobs required to implement the test plan, as indicated by the feedback, in embodiments. The jobs may include pointers to the production data and instructions associated with the jobs. Workers access the jobs for replay in system under test 180. Since workers and controllers independently interact with the jobs in the job queue, each may be scaled independently and asynchronously, in embodiments. For example, workers can be scaled in response to the feedback and/or controllers can be scaled based on a combination of feedback and instructions in the test plan.

In some embodiments, workers 144*a-n* are implemented to perform jobs (e.g., test jobs) to play specified request data to the target service (e.g., to system under test 180 in FIG. 1). The play of the request data simulates loads on the target service. In some embodiments, the workers are scaled based on feedback values. For example, if feedback values indicate that jobs are not performed at a particular rate or at a rate below a predetermined threshold, then more workers may be added, by the load test controller 120. As another example, if feedback indicates the number of jobs in the queue exceed a threshold, the workers may be scaled to respond to the additional job load. In addition, (when a production service is the target) the queued jobs are performed on the production service in parallel with on-going client requests in some embodiments. This can create a real-world stress test for production services (e.g., system under test 180 in FIG. 1).

Figure 3A:
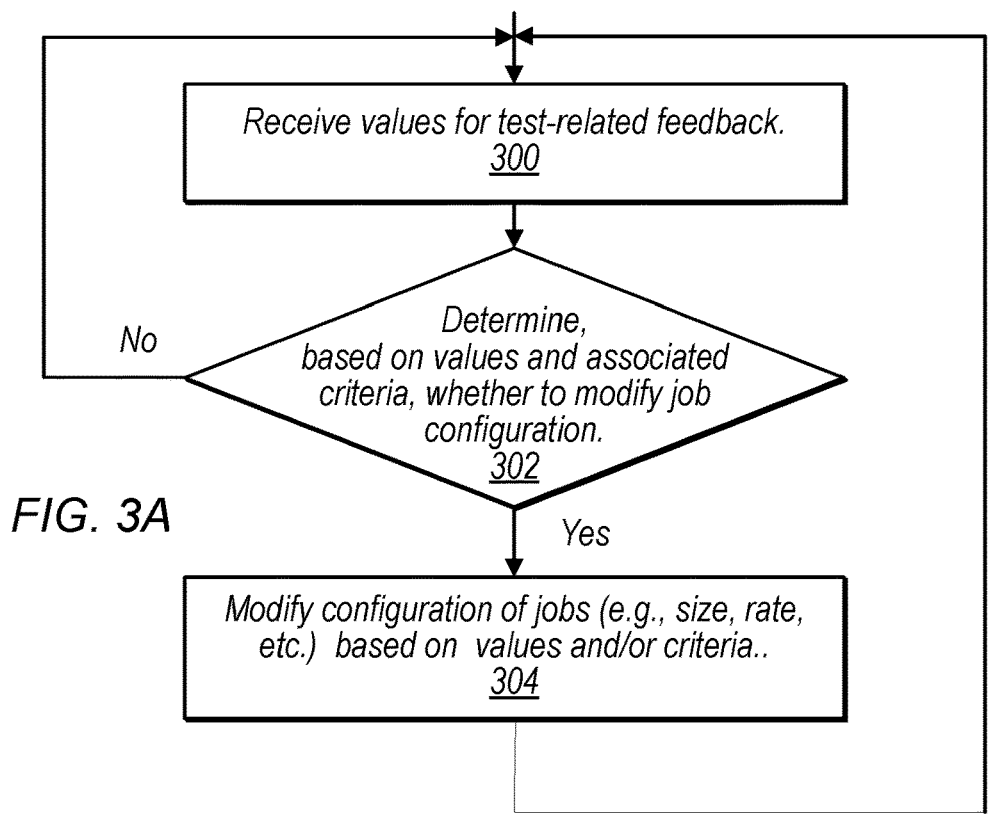
FIG. 3A illustrates a flowchart for configuring jobs based on feedback values, for a system that supports modification of load generation for testing a network-based service according to one embodiment.

FIG. 3A illustrates a flowchart for configuring jobs based on feedback values, for a system that supports modification of load generation for testing a network-based service according to one embodiment. The illustrated operations may be performed by components illustrated in FIGS. 1, 4, 5, and/or 6, in various embodiments.

As indicated in 300, values for test-related feedback are received. For example, a load step description may specify a duration for the load test, an operation distribution for the load test (e.g., the transaction types to be performed), feedback to be obtained, and a description of the load to be generated (e.g., a transaction frequency to be maintained and/or number of concurrent connections to be established). As the targets systems is undergoing testing, values for the specified feedback to be obtained may be received by the load test controller 120.

As indicated in 302, a determination is made, based on the values and associated criterion, whether to modify a job configuration. As explained above, sending jobs may include transmitting an object that includes instructions for a worker to perform one or more specified tasks for a specified amount of time. individual ones of the test jobs may be dequeued or otherwise read by worker hosts, and local jobs based on the test job descriptions may be executed at the worker hosts. A worker may attempt to execute each local job in accordance with the operation distribution and prescribed load (e.g., transaction frequency and/or number of concurrent connections) specified in the corresponding job description. A worker may attempt to execute each local job for the duration specified in the corresponding job description. In this manner, the total load required for a load step may be distributed among multiple worker hosts by using the job queue to decouple the workers from the load test controller. In the disclosed system, a controller may determine, based on feedback values and associated criterion, whether to modify a job configuration. For example, if, based on the feedback values, it is determined that jobs are too large or too small, or that jobs are not being produced at a desirable rate (e.g., too slow, too fast) the controller may determine that the configuration of the jobs should be modified (block 302, yes). Otherwise, the controller may wait for additional values (block 304, no).

Configuration of the jobs may be modified based on values and/or criterion (block 304). Modification of the job configuration may include altering characteristics of the jobs, such as a size of jobs, or a rate at which jobs are placed in a queue for the workers to retrieve, as non-exhaustive examples. After the modification, the controller may wait for additional values (the process may return to block 300).

Figure 3B:
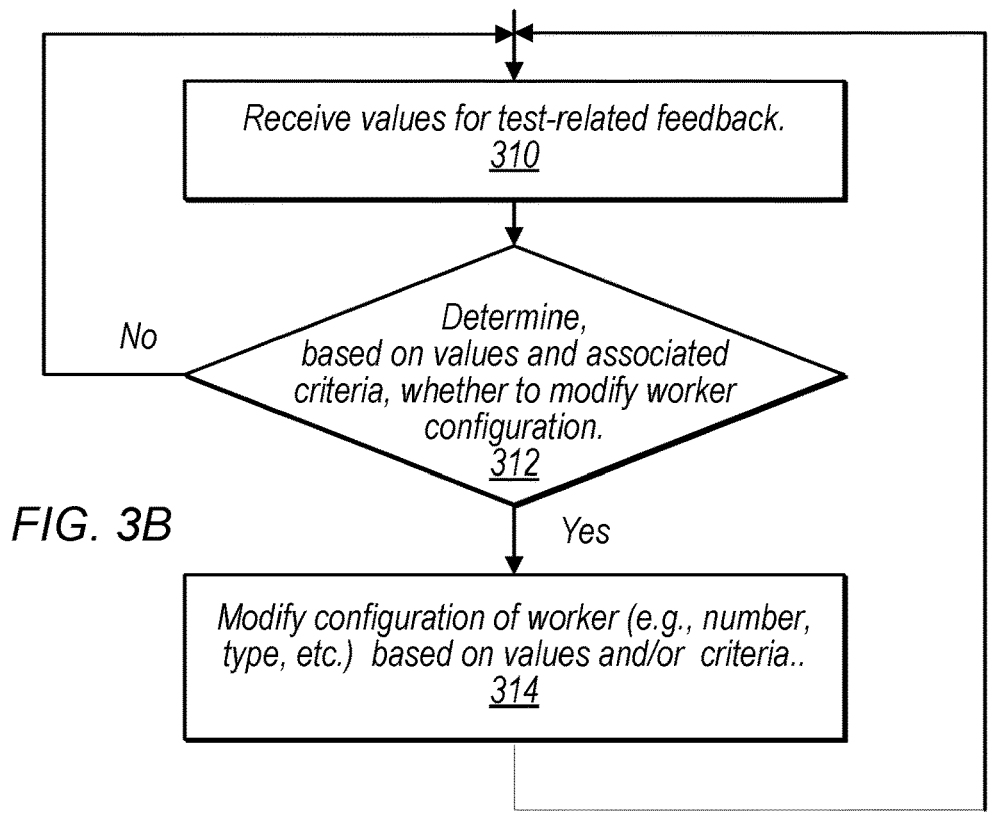
FIG. 3B illustrates a flowchart for configuring worker hosts based on feedback values, for a system that supports modification of load generation for testing a network-based service, according to one embodiment.

FIG. 3B illustrates a flowchart for configuring worker hosts based on feedback values, for a system that supports modification of load generation for testing a network-based service, according to one embodiment. In a manner similar to that described above for FIG. 3A, values for test-related feedback are received (block 310) and a determination of whether, based on feedback values and associated criterion, to modify worker configuration is made (block 312). For example, if, based on the feedback values, it is determined that there are too many workers, that workers are failing, or that more workers are needed, the controller may determine that the configuration of the workers should be modified (block 312, yes). Otherwise, the controller may wait for additional values (block 312, no).

Configuration of the workers may be modified based on the values and/or criteria (block 314). For example, the controller may determine that a number of worker hosts available to process jobs may be increased or decreased, in embodiments. For example, a process may include increasing or decreasing, based on one or more values for one or more metrics, a number of worker nodes provisioned to perform the jobs placed in the shared location (e.g., queue, etc.).

Figure 4A:
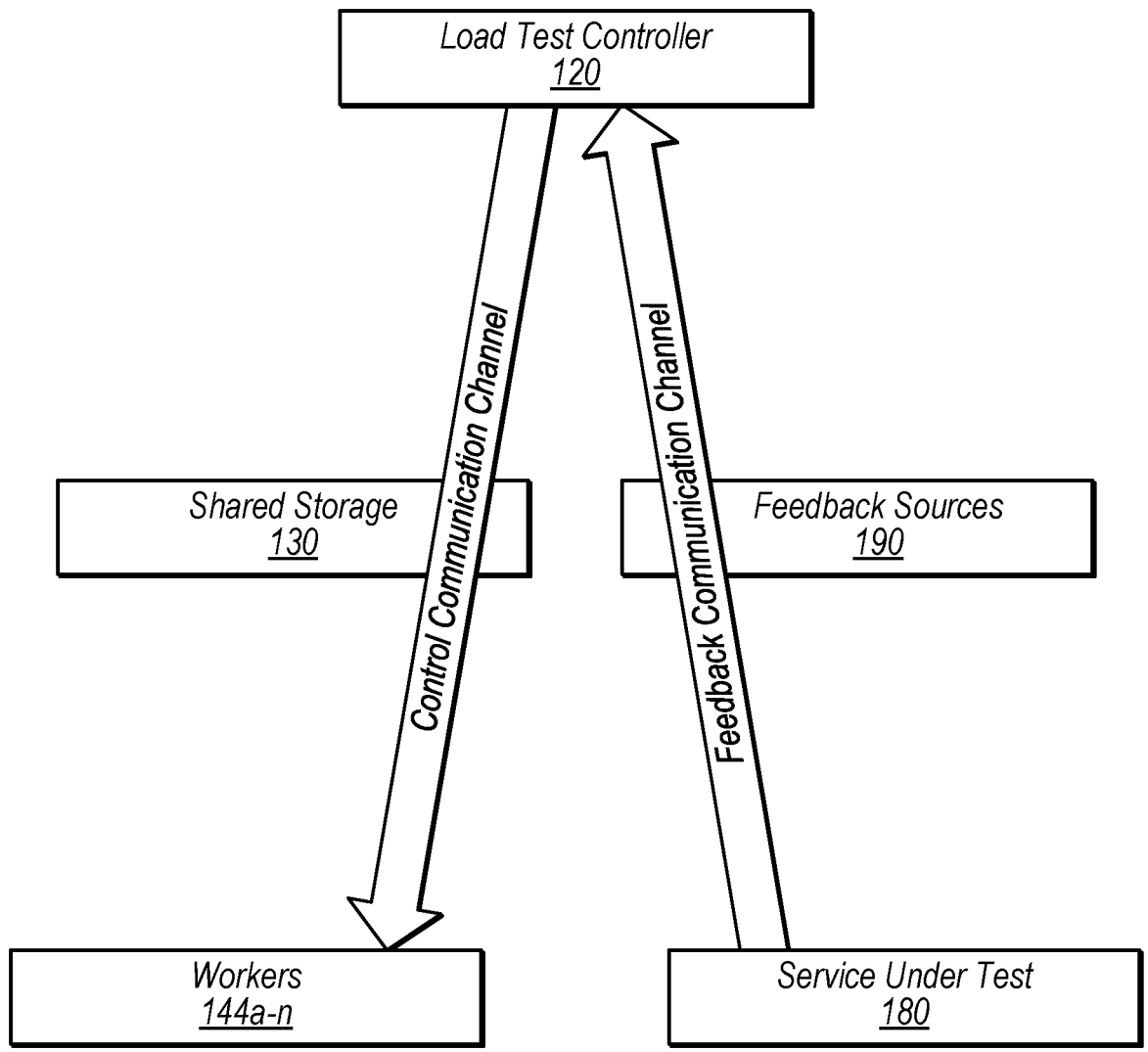
FIGS. 4A, 4B and 4C are block diagrams of various configurations of a control communication channel and a feedback communication channel, distinct from the control communication channel for a system that supports modification of load generation for testing a network-based service, according to one embodiment.
Figure 4B:
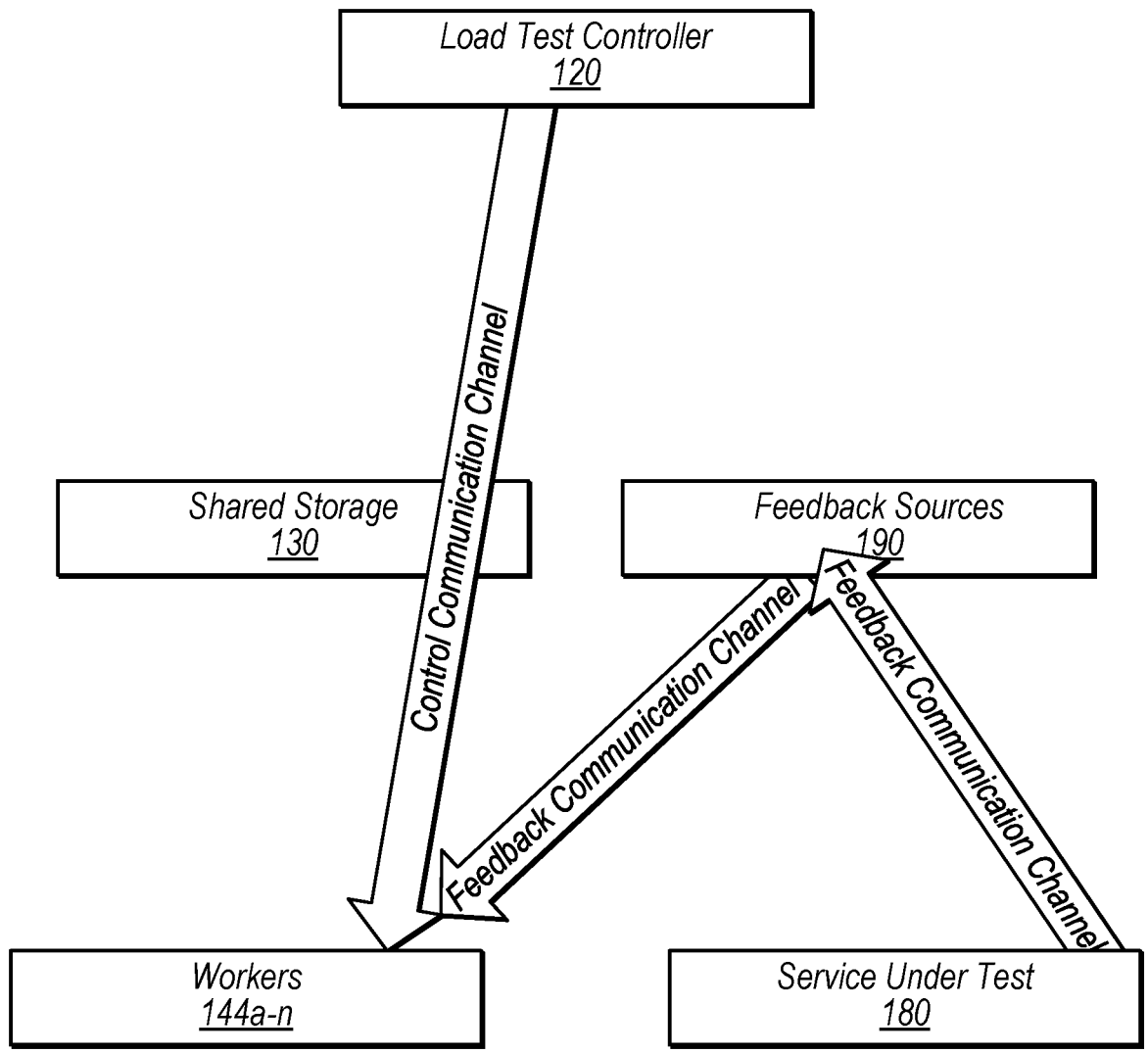
Figure 4C:
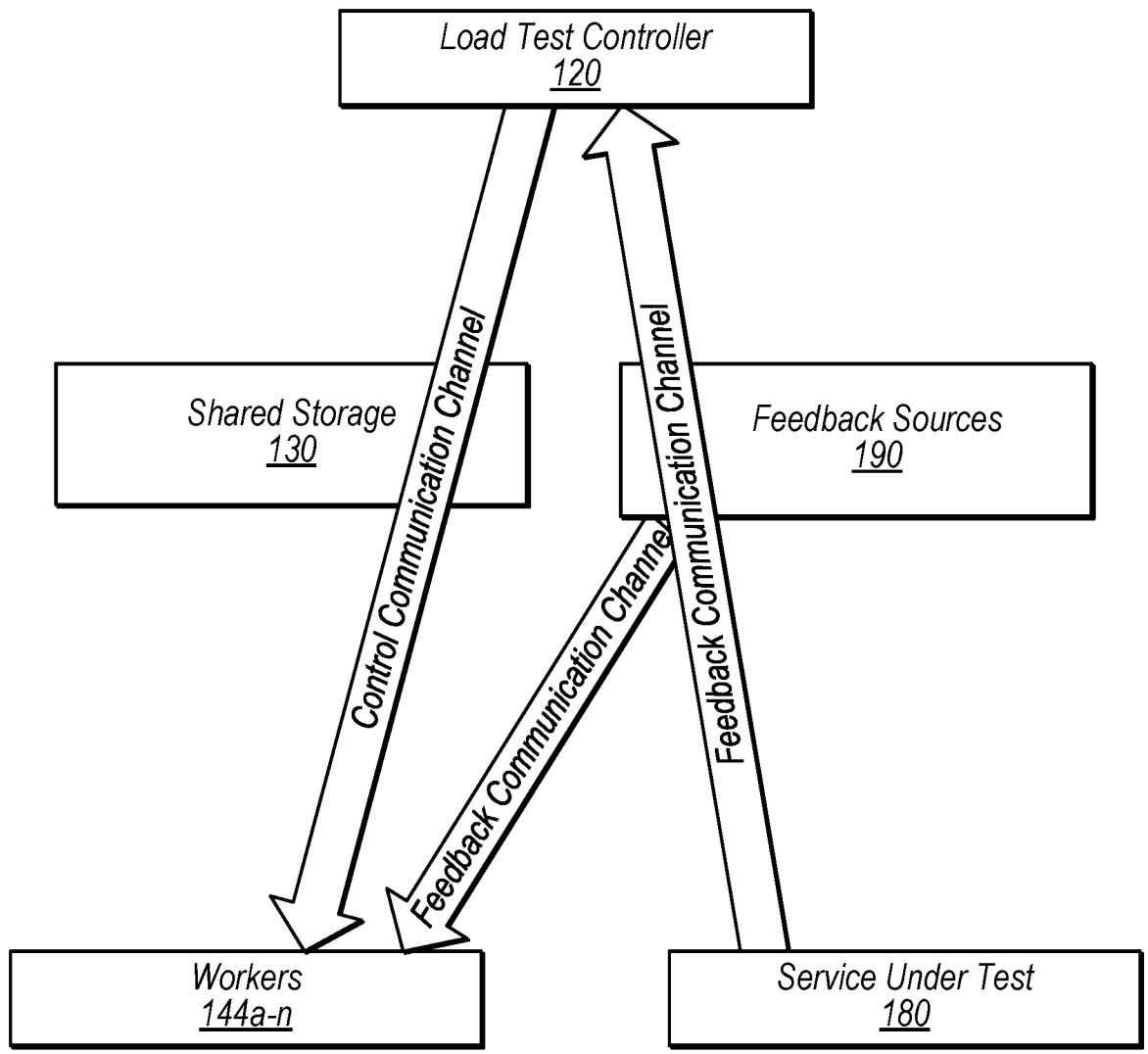

FIGS. 4A-C are block diagrams of various configurations of a control communication channel and a feedback communication channel, distinct from the control communication channel for a system that supports modification of load generation for testing a network-based service, according to one embodiment.

In at least some of the illustrated embodiments, load test controller 120 (or individual workers, in some embodiments) makes determinations describe herein based on feedback values from one or more feedback sources, as described herein (e.g., modifying load generation based on feedback values). In some instances, the load test controller (or the individual workers) tolerates brief time delays between changes to the load and the resulting changes to feedback as feedback values are aggregated. In embodiments controller 120 (or workers 144) implements feedback handling logic 127 that implements controller algorithms based on the feedback values, as described herein. In at least some of the illustrated embodiments, load test controller 120 pushes work units (e.g., jobs, job descriptions) to a shared resource (e.g., a queue 130) such as a message service or to a location in a key value storage service. Workers 144 fetch work from the shared storage 130 and generate a load that is sent to the service under test 180. In embodiments, this path from the load test controller that pushes the work units to the workers that fetch the work and causes a load to be generated on the system under test is a control communication channel (e.g., a unidirectional communication channel, in some embodiments). In some embodiments, the shared resource (e.g., a queue) is the control communication channel.

FIG. 4A illustrates that feedback data is generated, based on the service under test 180. For example, one or more services or systems that interact with the service under test may produce feedback data associated with the performance of the system under teste. In another example, a monitoring service may produce operational feedback (e.g., regular, normal operational metrics produced for a monitoring service (e.g., illustrated as feedback source 190) that are aggregated and stored by the monitoring service (e.g., illustrated as feedback source 190). In embodiments, the operational metric values are received from a monitoring service that monitors the production service to determine the metric values, stores the metrics values, and provides the metric values to the load test controller. In embodiments, load test controller 120 reads or otherwise receives the metric data from the monitoring service. This path of the feedback values about the service under test 180 via the various feedback sources and finally to the load test controller 120 is a feedback communication channel, in some embodiments (e.g., a unidirectional communication channel, in some embodiments). In embodiments, the loose coupling between the load test controller, the workers and the service under test facilitates generation of large-scale loads, unlike prior systems that rely upon more tightly coupled, synchronous communications.

In embodiments, the feedback (e.g., performance metric values) on which the load test controller bases the modulation of the rate are received via a feedback communication channel that is distinct from a control communication channel that causes the one or more workers to access and play the production request data.

FIG. 4B illustrates a configuration where individual workers 144 (instead of controller 120) receive feedback values, and based on the feedback values, determine changes to the load generation, performing fewer jobs, altering the size of jobs, skipping jobs, or the like, etc. In some embodiments, the load test controller 120 does not receive the feedback values, and does not determine whether to change the test load and does not determine changes to the configuration of the test load.

FIG. 4C illustrates a configuration where both individual workers 144 and controller 120 receive feedback (e.g., each may receive different or the same feedback, to make respective determinations). In some such embodiments, a load test controller may determine whether to modify the quantity of workers, and individual workers may determine whether to modify the amount of work being performed (e.g., modifying a size or rate of job performance, or the like).

Figure 5:
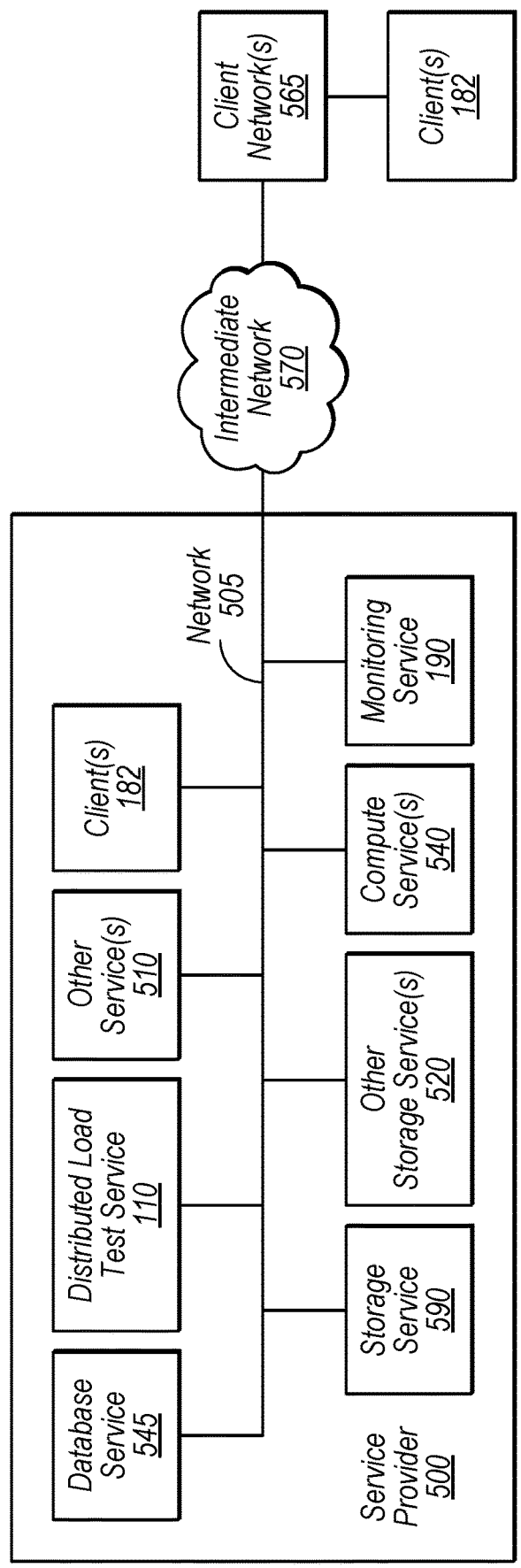
FIG. 5 illustrates a configuration of a service provider system that provides a service that supports modification of load generation for testing a network-based service, according to one embodiment.

FIG. 5 is a block diagram illustrating a service provider 500 that implements a distributed load test system as a service 110, according to some embodiments. Depicted is a distributed load test service 110 similar to the functionality provided by distributed load test system 110 illustrated in FIG. 1 that may perform some of the steps illustrated in at least FIGS. 2-4. The distributed load test service 110 is illustrated as part of service provider network 505 that includes monitoring service 190, database service 545, storage service 590, compute service 540, client(s) 182 as well as other storage services 520 and other services 510. In at least the illustrated embodiment, the service provider network 500 is communicatively coupled to client networks 565 and clients 182 via intermediate network(s) 570. Service provider 500 may provide one or more services to a plurality of distinct customers 182, each distinct customer comprising a distinct customer network 565, in embodiments. One or more of the components in FIG. 5 may be implemented by one or more of the computing nodes 600 illustrated in FIG. 6, in embodiments.

It is contemplated that in at least some embodiments, workers may each include logic similar to the metric-handling logic 127 and self-regulate based on metrics associated with the system under test. For example, worker 144*a* in FIG. 1 may obtain a job from job queue 130 and determine and execute the tasks specified in the job while obtaining or otherwise receiving metric values that indicate performance of the system under test 180. Worker 144*a* may modulate based on the metric values, for example, modulate the rate at which it performs tasks or modulate a rate at which the worker obtains jobs from the job queue. In some embodiments, metric-handling logic 127 may be located in both the load test controller 120 and in workers 144. In some embodiments, metric-handling logic 127 may be located in either the load test controller 120 or in workers 144, but not both.

Example Computer System

Figure 6:
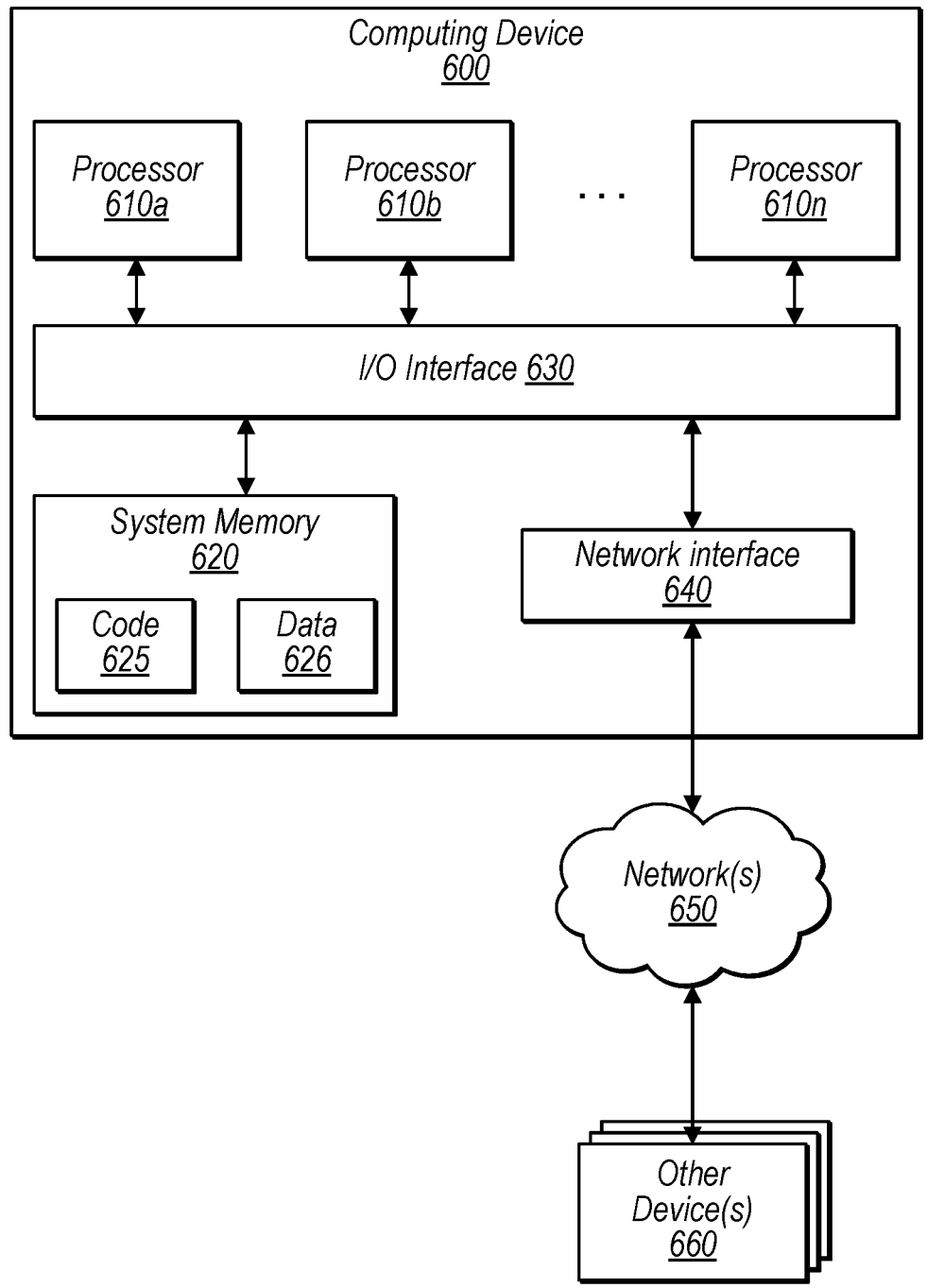
FIG. 6 illustrates a computer system for use in implementing a distributed load test system, or for implementing services of a service provider, according to embodiments.

FIG. 6 is a diagram that illustrates a computer system for use in implementing the disclosed test system, according to one embodiment. Various portions of systems in FIGS. 1, 4 and 5 and/or methods presented in FIGS. 2, 3A and 3B described herein, may be executed on one or more computer systems similar to that described herein, which may interact with various other devices of the system.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 660, such as cursor control device, keyboard, audio device, and display(s). In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for load testing may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 620 may be configured to store program instructions and/or data accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a distributed load test system and method, are shown stored within system memory 620 as program instructions 625 and data storage 626, respectively. In other embodiments, program instructions and/or data may be received, sent, or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640. Program instructions may include instructions for implementing the techniques described with respect to any of the FIGs.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 600 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions 625, configured to implement embodiments of a distributed load test system and methods as described herein, and data storage 626, comprising various data accessible by program instructions 625. In one embodiment, program instructions 625 may include software elements of a method illustrated in the above figures. Data storage 626 may include data that may be used in embodiments described herein. In other embodiments, other or different software elements and/or data may be included.

Those skilled in the art will appreciate that computer system 600 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a controller, implemented as instructions that are executed by one or more computers, the controller configured to generate test jobs according to a test plan for testing a target system;
   a job queue to receive and queue test jobs from the controller; and
   one or more workers, implemented as instructions that are executed by one or more computers, the workers configured to access test jobs from the job queue and play data to the target system as specified by the test jobs;
   wherein the controller is configured to:
      receive test-related feedback values from one or more feedback sources, and
      modify, based on the feedback values, test job load.

2. The system of claim 1, wherein the test-related feedback values on which the controller bases the modification of the test job load are received via a feedback communication channel that is distinct from a control communication channel between the controller and the one or more workers.

3. The system of claim 1, wherein to modify the test job load, the controller is configured to modify configuration of one or more of the test jobs of the test job load or modify configuration of one or more of the workers, based on the received values and one or more criterion.

4. The system of claim 1, further comprising:
   a monitoring service configured to:
      monitor resources that implement the one or more workers, or one or more characteristics of the target system;
      based on the monitoring, aggregate and store metric values; and
      provide, to the controller, one or more of the stored metric values.

5. A computer-implemented method, comprising:
   generating, by a controller, test jobs for testing a target system;
   sending, by the controller, the test jobs to a shared storage resource, wherein workers, implemented as instructions that are executed by one or more computers, are configured to access test jobs from the shared storage resource and play data to the target system as specified by the test jobs;
   obtaining, by the controller from one or more feedback sources, test-related feedback values; and
   modifying, by the controller based on the feedback values, a test job load.

6. The method of claim 5, further comprising:
   receiving, via an interface, specification of a test plan that indicates the test-related feedback and one or more associated criterion for determining whether to perform said modifying; and
   determining, based on the test-related feedback values and the criterion, to modify a size or a rate of test jobs; and
   wherein said modifying the test job load comprises modifying, based on the feedback values, configuration of test jobs or configuration of workers.

7. The method of claim 5, wherein said sending the test jobs comprises transmitting an object that includes instructions for a worker to perform one or more specified tasks for a specified amount of time.

8. The method of claim 5, comprising:
   performing, by a distributed load test service of a service provider: said generating, sending, obtaining, and modifying to provide test job load generation as a service to one more clients of the service provider.

9. The method of claim 5, wherein said modifying comprises:
   applying a metric value to an additive-increase/multiplicative-decrease algorithm to determine the modification to the test job load.

10. The method of claim 5, wherein:
    the target system is a production system; and
    generating test jobs comprises generating test jobs that specify use of production request data from a data store that stores requests previously made to the production system from customers of the production system.

11. The method of claim 5, wherein said modifying comprises:
    increasing or decreasing, based on the feedback values, a number of worker nodes provisioned to perform the test jobs.

12. The method of claim 5,
    wherein said obtaining test-related feedback values comprises receiving metrics via a communication feedback channel that is separate from a control communication channel between the controller and the workers; and
    wherein said modifying the test job load comprises modifying a rate test jobs are sent to the shared storage resource based on the metrics received via a communication feedback channel.

13. One or more non-transitory media comprising program instructions that are executable by one or more processors to:

generate, by a controller, test jobs for testing a target system;

instruct, by the controller, the test jobs to be sent to a shared storage resource, wherein workers implemented as instructions that are executed by one or more computers are configured to access test jobs from the shared storage resource and play data to the target system as specified by the test jobs; and modify, by the controller based on test-related feedback received from one or more feedback sources, test job load.

14. The one or more non-transitory media of claim 13, wherein:

the program instructions cause the one or more processors to implement an interface configured to receive specification of a test plan that indicates the test-related feedback and one or more associated criterion for determining whether to perform said modify.

15. The one or more non-transitory media of claim 14, wherein to modify the test job load, the program instructions cause the one or more processors to implement:

determine, based on the test-related feedback values and the criterion, a modification to a size or a rate of test job sent to the shared storage resource.

16. The one or more non-transitory media of claim 15, wherein to determine the modified rate for sending the test jobs to the shared storage resource, the program instructions cause the one or more processors to apply a metric value to a proportional-integral-derivative (PID) algorithm to determine the modified rate.

17. The one or more non-transitory media of claim 14, wherein to modify the test job load, the program instructions cause the one or more processors to implement:

determine, based on the test-related feedback values and the criterion, a modification to a configuration of workers.

18. The one or more non-transitory media of claim 13, wherein to instruct test jobs to be sent, the program instructions cause the one or more processors to instruct transmission of an object that includes instructions for one or more workers to perform one or more specified tasks for a specified amount of time.

19. The one or more non-transitory media of claim 13, wherein the program instructions cause the one or more processors to obtain the test-related feedback values from a monitoring service that monitors resources that implement the workers, or that monitors characteristics of the target system.

20. The one or more non-transitory media of claim 13, wherein:

the target system is a production system; and to perform said generate test jobs, the program instructions cause the one or more processors to generate test jobs that specify use of production request data from a data store that stores requests previously made to the production system from customers of the production system.

* * * * *